(12) United States Patent
Biskeborn

(10) Patent No.: US 7,414,811 B2
(45) Date of Patent: Aug. 19, 2008

(54) MAGNETIC HEAD HAVING THREE MODULES

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 11/213,366

(22) Filed: Aug. 26, 2005

(65) Prior Publication Data

US 2007/0047142 A1  Mar. 1, 2007

(51) Int. Cl.
*G11B 15/60* (2006.01)
*G11B 5/187* (2006.01)

(52) U.S. Cl. ..................................... 360/129
(58) Field of Classification Search ................. 360/129, 360/121, 119.01, 130.1, 130.2, 130.21, 130.3, 360/130.31
See application file for complete search history.

(56) References Cited

U.S. PATENT DOCUMENTS

| | | | | |
|---|---|---|---|---|
| 4,414,596 A | * | 11/1983 | Nakamichi | 360/129 |
| 4,967,300 A | * | 10/1990 | Reid et al. | 360/122 |
| 5,034,838 A | * | 7/1991 | Brock et al. | 360/122 |
| 5,175,660 A | * | 12/1992 | Mitsuhashi et al. | 360/130.34 |
| 5,237,476 A | * | 8/1993 | Bischoff et al. | 360/123.1 |
| 5,307,227 A | * | 4/1994 | Okada et al. | 360/122 |
| 5,737,158 A | * | 4/1998 | Tanaka et al. | 360/130.21 |
| 5,883,770 A | * | 3/1999 | Biskeborn et al. | 360/130.21 |
| 5,905,613 A | * | 5/1999 | Biskeborn et al. | 360/130.21 |
| 6,122,147 A | * | 9/2000 | Fahimi et al. | 360/221 |
| 6,151,191 A | * | 11/2000 | Muftu et al. | 360/271.1 |
| 6,282,055 B1 | * | 8/2001 | Lakshmikumaran et al. | 360/122 |
| 6,341,416 B1 | * | 1/2002 | Biskeborn et al. | 29/603.12 |
| 6,700,733 B1 | | 3/2004 | Biskeborn | 360/90 |
| 6,760,199 B2 | | 7/2004 | Biskeborn | 360/323 |
| 6,781,792 B2 | * | 8/2004 | Biskeborn | 360/129 |
| 6,972,931 B2 | * | 12/2005 | Rudi et al. | 360/241 |
| 7,154,691 B2 | * | 12/2006 | Girvin et al. | 360/61 |
| 2003/0179499 A1 | * | 9/2003 | Shinjo et al. | 360/129 |

\* cited by examiner

*Primary Examiner*—Brian E. Miller
*Assistant Examiner*—Matthew G Kayrish
(74) *Attorney, Agent, or Firm*—Zilka-Kotab, PC

(57) ABSTRACT

A magnetic head according to one embodiment includes a first module having a flat profile tape bearing surface, a second module having a flat profile tape bearing surface, and a third module having a flat profile tape bearing surface. The third module is positioned on an opposite side of the second module than the first module. The tape bearing surfaces of the first, second and third modules may lie along substantially parallel planes, may be configured in a tangent (angled) configuration, or may be configured in an overwrap configuration. Data writing and reading functions are usually performed by different modules at a given time.

18 Claims, 10 Drawing Sheets

MAGNETIC HEAD HAVING THREE MODULES

RELATED APPLICATIONS

This application is related to U.S. Patent Application entitled "MULTI-FORMAT MAGNETIC HEAD" to Biskeborn et al., filed concurrently herewith, and U.S. Patent Application entitled "MAGNETIC HEAD WITH PLANAR OUTRIGGER" to Biskeborn et al., filed concurrently herewith.

FIELD OF THE INVENTION

The present invention relates to magnetic head structures, and more particularly, this invention relates to a magnetic head structure having multiple modules and modes of operation.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved magnetic read/write heads, improved error correction techniques and decreased areal bit sizes. The data capacity of half-inch magnetic tape, for example, is now measured in hundreds of gigabytes on 512 or more data tracks.

FIG. 1 illustrates a traditional flat-lapped bi-directional, two-module magnetic tape head 100, in accordance with the prior art. As shown, the head includes a pair of bases 102, each equipped with a module 104. The bases are typically "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

Two common parameters are associated with heads of such design. One parameter includes the tape wrap angles $\alpha_i$, $\alpha_o$ defined between the tape 108 and a plane 111 in which the upper surface of the tape bearing surface 109 resides. It should be noted that the tape wrap angles $\alpha_i$, $\alpha_o$ includes an inner wrap angle $\alpha_i$ which is often similar in degree to an external, or outer, wrap angle $\alpha_o$. The tape bearing surfaces 109 of the modules 104 are set at a predetermined angle from each other such that the desired inner wrap angle $\alpha_i$ is achieved at the facing edges. Moreover, a tape bearing surface length 112 is defined as the distance (in the direction of tape travel) between edges of the tape bearing surface 109. The wrap angles $\alpha_i$, $\alpha_o$ and tape bearing surface length 112 are often adjusted to deal with various operational aspects of heads such as that of Prior Art FIG. 1, in a manner that will soon become apparent.

During use of the head of FIG. 1, various effects traditionally occur. FIG. 2 is an enlarged view of the area encircled in FIG. 1. FIG. 2 illustrates a first known effect associated with the use of the head 100 of FIG. 1. When the tape 108 moves across the head as shown, air is skived from below the tape 108 by a skiving edge 204 of the substrate 104A, and instead of the tape 108 lifting from the tape bearing surface 109 of the module (as intuitively it should), the reduced air pressure in the area between the tape 108 and the tape bearing surface 109 allows atmospheric pressure to urge the tape towards the tape bearing surface 109.

As data density increases, gap-to-gap distance between the modules (gaps being where the elements are located) becomes more important. For example, in read-while-write operation, the readers on the trailing module read the data that was just written by the leading module so that the system can verify that the data was written correctly. If the data is not written correctly, the system will recognize the error and can rewrite the data. However, the tape does not move across the tape bearing surfaces perfectly linearly. Rather, the tape may shift back and forth, or "wobble," as it crosses the tape bearing surfaces, resulting in dynamic skew, or misalignment of the trailing readers with the leading writers. The effects of wobble are exacerbated as track density increases. The farther the readers are behind the writers, the more chance that track misregistration will occur. If it does occur, the system may incorrectly believe that a write error has occurred. Additionally, there is an ongoing need to increase the number of active channels in the head for maintaining data rate as the number of tracks on the tape and thus cartridge capacity increases. For instance, a jump from 16 to 32 channels results in double the wiring, and so requires cabling comprising more than 128 leads, for modules with a reader/writer pair for each of the 32 channels plus servo readers and other connections. Such cabling is complex and bulky.

Further, a typical substrate to closure gap length is 25-35 microns for a piggyback reader/writer pair. The tape irregularities tend to droop slightly into this gap and erode the elements. This produces head-tape spacing problems, such as declining signal resolution.

There is accordingly a clearly-felt need in the art for a tape head assembly in which the gap-to-gap spacing between opposing modules is minimized. There is also a need for a tape head assembly that minimizes the substrate-to-closure gap length. There is a further need for a tape head assembly that allows the use of cables having a minimum number of I/O wires. These unresolved problems and deficiencies are clearly felt in the art and are solved by this invention in the manner described below.

SUMMARY OF THE INVENTION

A magnetic head according to one embodiment includes a first module having a flat profile tape bearing surface, a second module having a flat profile tape bearing surface, and a third module having a flat profile tape bearing surface. The third module is positioned on an opposite side of the second module than the first module. The tape bearing surfaces of the first, second and third modules lie along substantially parallel planes, the planes being offset from one another. Writing and reading functions are performed by different modules at a given time.

In one embodiment, the second module includes a plurality of data readers and optionally servo readers and no writers. The first and third modules include a plurality of writers and no readers except optional servo readers. Preferably, the writers of the first and third modules are positioned in a gap, where the gap is less than about 15 microns thick as measured parallel to a direction of tape travel thereover. Also, the reader of the second module can be positioned in a gap on the associated module, where each gap is less than about 12, and ideally less than about 8, microns thick as measured parallel to a direction of tape travel thereover. These smaller gaps tend to exhibit less wear and reduced debris accumulation.

In one embodiment, the gap to gap spacing between the gaps of the first and second modules, and second and third modules, is less than about 1 mm, and more preferably less than about 0.75 mm. A gap-to-gap spacing of 0.75 mm is about 50% less than present Linear Tape Open (LTO) tape head spacing.

The plane of the tape bearing surface of the first module may be positioned below the plane of the tape bearing surface of the second module. The plane of the tape bearing surface of the third module may also be positioned below the plane of the tape bearing surface of the second module. The plane of the tape bearing surface of the first module may lie along substantially the same plane as the tape bearing surface of the third module.

In some embodiments, the second module has a closure, while the first and third modules do not have a closure. In other embodiments, the first, second, and third modules each have a closure, but the closure of the first and third modules are preferably shorter than the closure of the second module as measured parallel to a direction of tape travel over the respective module.

Outriggers may be provided for setting the outer wrap angles of the first and third modules. In one embodiment, at least one of the modules includes a first array of elements and a second array of elements, the first array of elements being associated with a first data format, the elements of the first array being selected from a group consisting of readers, writers, and combinations thereof. The second array of elements is associated with a second data format, the elements of the second array being selected from a group consisting of readers, writers, and combinations thereof. Preferably, the first and second arrays of elements of the at least one of the modules are adjacent each other in a direction transverse to a direction of travel of a magnetic medium over the head. In a further variation, the second array of the at least one of the modules is a scaled version of the first array of the at least one of the modules.

In an embodiment, a tape passing across the first module prior to passing across the third module does not become parallel to the tape bearing surface of the third module when passing across the third module. Rather, the tape will entrain air and so will not ride on the tape bearing surface of the third module. This reduces wear on the third module.

A first wrap angle is defined between the tape bearing surfaces of the first and second modules. A second wrap angle is defined between the tape bearing surfaces of the second and third modules. Illustrative first and second wrap angles are in a range of about 0.70 to about 1.10.

A magnetic head in a tangent (angled) configuration includes a first module having a tape bearing surface, a second module having a tape bearing surface, and a third module having a tape bearing surface, the third module being positioned on an opposite side of the second module than the first module. The tape bearing surface of the first and/or third module is angled relative to the second module so as to be in a plane of a tape oriented at a desired wrap angle relative to the tape bearing surface of the second module at an edge of the tape bearing surface of the second module closest to the first module. Again, writing and reading functions are performed by different modules at a given time. Additional aspects of this embodiment are similar to those given above.

A magnetic head in an overwrap configuration includes a first module having a flat profile tape bearing surface and a plurality of elements of like kind selected from a group consisting of readers and writers, a second module having a flat profile tape bearing surface and a plurality of elements of like kind selected from a group consisting of readers and writers, and a third module having a flat profile tape bearing surface and a plurality of elements of like kind selected from a group consisting of readers and writers, the third module being positioned on an opposite side of the second module than the first module. The tape bearing surface of the first and or third module is angled from the tape bearing surface of the second module by greater than a desired wrap angle of a tape relative to the tape bearing surface of the second module. Writing and reading functions are performed by different modules at a given time. The second module performs a read function when the first module performs a write function. The second module performs a read function when the third module performs a write function. As an option, the first and third modules perform a read function when the second module performs a write function, depending on tape motion direction. Additional aspects of this embodiment are similar to those given above.

A tape drive system includes a head as recited above, a drive mechanism for passing a magnetic recording tape over the head, and a controller in communication with the head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior Art

Prior Art

BEST MODE FOR CARRYING OUT THE INVENTION

Figure 1:
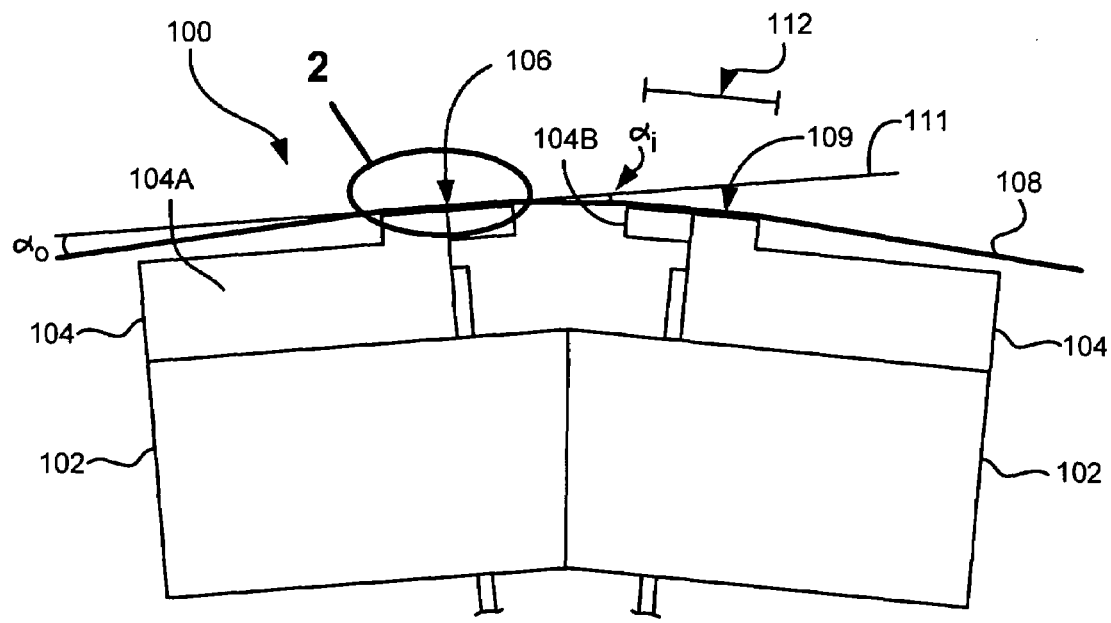
FIG. 1 illustrates a traditional flat-lapped magnetic tape head, in accordance with the prior art.
Figure 2:
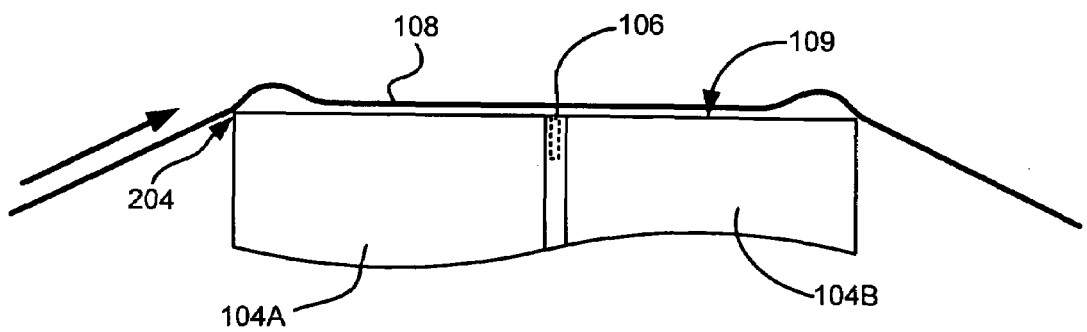
FIG. 2 is an enlarged view of Circle 2 of FIG. 1, showing a first known effect associated with the use of the head of FIG. 1.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The embodiments described below disclose a new head design that includes three modules in which the writing and reading functions are separated. The design of the head results in reduced dynamic skew, very low spacing loss, reduced wear, and compliant cabling.

Figure 3:
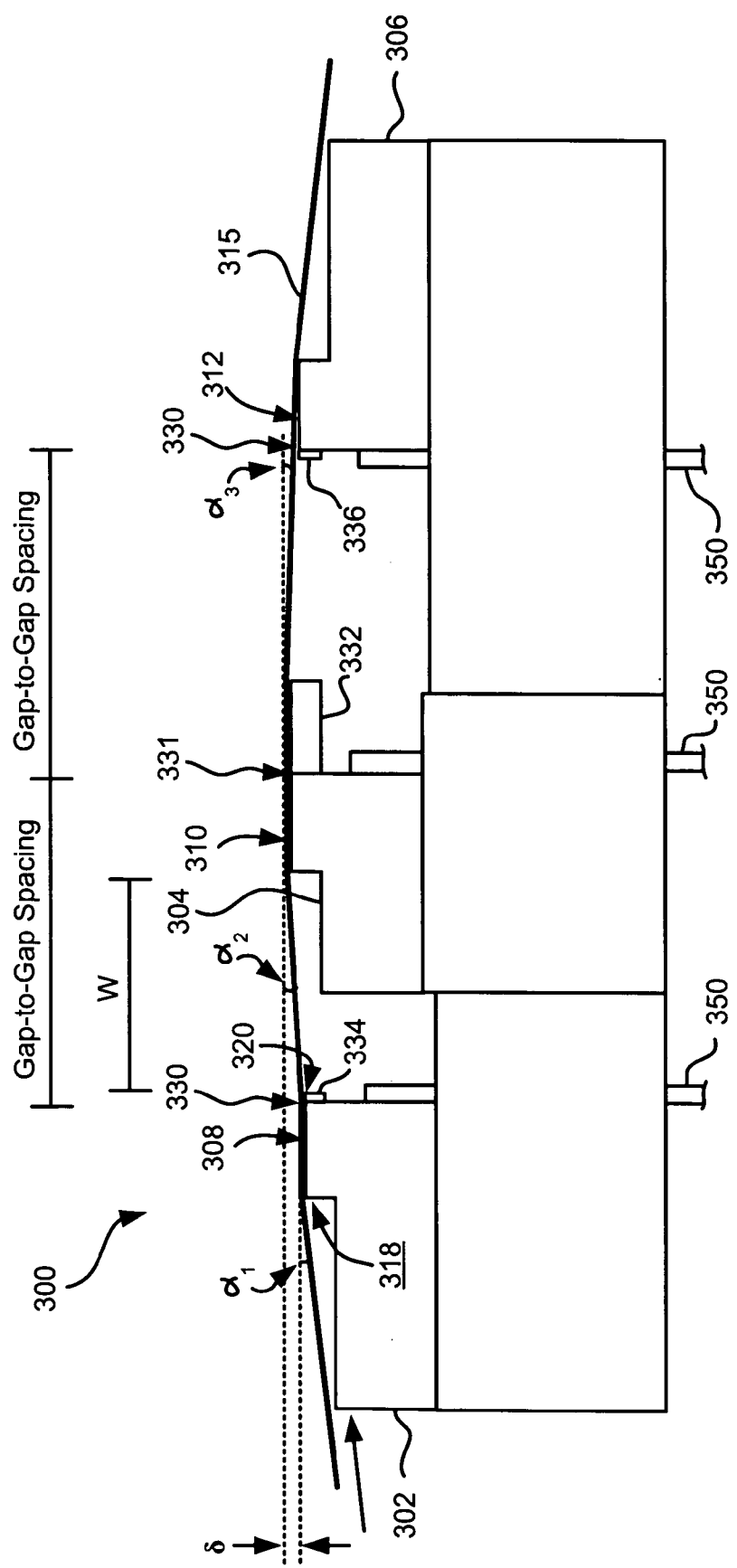
FIG. 3 is a side view of a magnetic tape head with three modules according to one embodiment where the modules all generally lie along parallel planes.

FIG. 3 illustrates a magnetic head 300 according to one embodiment of the present invention that includes first, second and third modules 302, 304, 306 each having a flat profile tape bearing surface 308, 310, 312 respectively. Note that while the term "tape bearing surface" appears to imply that the surface facing the tape 315 is in physical contact with the tape bearing surface, this is not necessarily the case. Rather, it is more typical that a portion of the tape is in contact with the tape bearing surface, constantly or intermittently, and other portions of the tape ride above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

In this embodiment, the tape bearing surfaces 308, 310, 312 of the first, second and third modules 302, 304, 306 lie on parallel planes such that the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The inventor has found that the tape stays close to the tape bearing surface until close to the trailing edge 320 of the leading module 302. Accordingly, read and/or write elements 330 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.7° to about 1.1°, though can be any angle required by the design.

Beneficially, the inner wrap angle $\alpha_2$ will be slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note also that because the tape bearing surfaces 308, 312 of the outer modules 302, 306 are lower than the tape bearing surface 310 of the second module 304, a negative wrap angle is achieved at the trailing edge 320 of the leading module 302. This is generally beneficial in helping to reduce wear of the trailing edge 320, provided that proper consideration is given to the location of the crowbar region that forms in the tape where it peels off the head. The negative wrap angle also reduces flutter and scrubbing damage to the elements on the leading module 302. Further, at the trailing module 306, the tape 315 flies over the tape bearing surface 312 so there is virtually no wear on the elements. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of standard writers 330 and no readers, with the exception that the outer modules 302, 306 may include optional servo readers. The servo readers are used to position the head during writing operations. The total mechanical gap for a writer module can be reduced to approximately 15 micrometers (or less) if the writers are not piggybacked on readers. The reader mechanical gap can be reduced even further than that in the absence of piggybacked writers. For example, the readers of the second module 304 can be positioned in a gap, where the gap is less than about 12 microns thick, e.g., 7-12 microns, as measured parallel to a direction of tape travel thereover. These smaller gaps may exhibit less wear and reduced debris accumulation.

By having only readers or side by side writers and servo readers in the gap between the substrate and closure, the gap length can be substantially reduced. Typical heads have piggybacked readers and writers, where the writer is formed above each reader. A typical gap is 25-35 microns. However, the tape irregularities tend to droop into the gap and create gap erosion. Thus, the smaller the gap is the better. The smaller gap enabled herein exhibits fewer wear related problems.

Where each module has only readers or writers, subject to exceptions listed herein, the reader processing may be optimized and yielded independently of the writer processing (on a different module), and conversely. The servo readers may be omitted from the writers, depending on dynamic skew limitations. Alternatively, servo readers may reflect older technology (AMR) with wider gaps than data readers (GMR).

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 3, the first, second, and third modules 302, 304, 306 each have a closure, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, are preferably shorter than the closure 332 of the second module 304 as measured parallel to a direction of tape travel over the respective module. This enables setting the modules closer together. One way to produce the shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 mm, which in some embodiments is ideal for stabilizing tape motion over the second module 304.

The outer wrap angles $\alpha_1$ are typically set in the drive, such as by rollers. For instance, rollers having an offset axis may be used to set the wrap angles. The offset axis creates an orbital arc of rotation, allowing precise alignment of the wrap angle $\alpha_1$.

Figure 4:
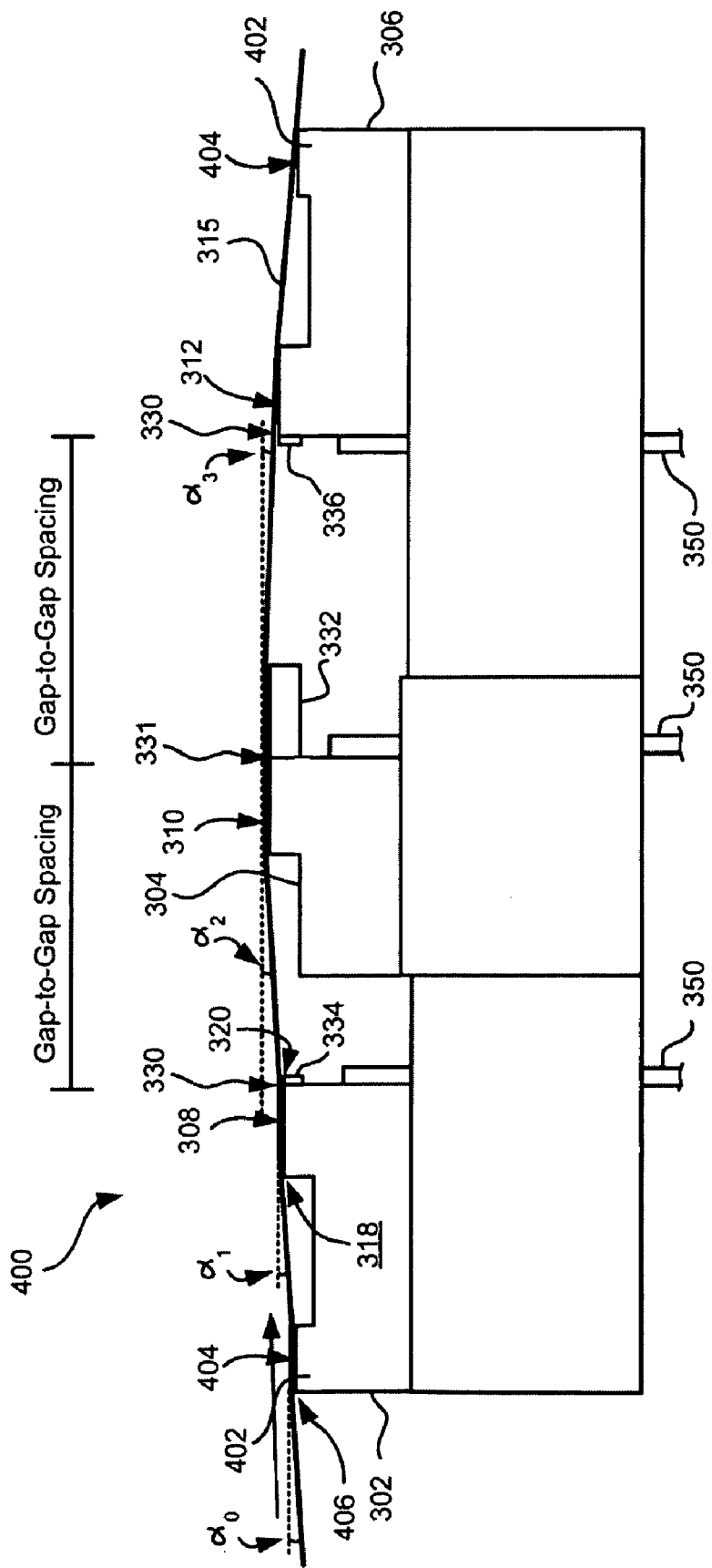
FIG. 4 is a side view of a magnetic tape head with three modules and outriggers on the outer modules.

The outer wrap angles can also be set by outriggers. FIG. 4 illustrates an embodiment 400 where outriggers 402 are formed on the outer modules 302, 306.

The outriggers 402 control the outer wrap angle $\alpha_1$ of the tape 315 relative to the tape bearing surfaces 308 of the leading module 302. As shown, each outrigger 402 may have a flat tape bearing surface 404 that, like typical flat profile heads, induces a small spacing between a tape 315 passing thereover and its tape bearing surface 404. The outrigger 402 may lie on a parallel plane as the tape bearing surface of the associated module. In such an embodiment, the outrigger tape bearing surface 404 is positioned below the plane of the tape bearing surface of the associated element, thereby creating the proper wrap angle $\alpha_1$ of the tape 315 relative to the tape bearing surface of the associated module.

A benefit of this embodiment is that, because the outrigger 402 may be formed directly on the module, the outer wrap angle $\alpha_1$ is always precisely set (Oust as the inner wrap angles $\alpha_2$ are fixed when the modules are coupled together).

While the outrigger 402 is preferably integrally formed on the associated module, alternatively, the outrigger 402 can be a separate piece mounted to the associated module, mounted in the drive, not directly coupled to the module but held in position relative thereto by mounting hardware in the drive, etc. As mentioned above, it is preferable that the outrigger 402 is fixedly coupled in relation to the associated module, so that the outer wrap angles $\alpha_1$ remain fixed regardless of initial outer wrap angle $\alpha_o$ of the tape approaching the outrigger 402.

By using an outrigger 402, the initial wrap angle $\alpha_o$ is less critical, and so greater tolerances are permitted. Particularly, tape wrap variations at the outer (skiving) edge 406 of the outrigger 402 do not change the internal wrap angle $\alpha_1$. A suggested initial wrap angle $\alpha_o$ for the outrigger 402 is 0.6°±0.5° or 0.7°±0.5°, but can be as high as 2° or higher. The inventor has found that only a very slight initial wrap angle $\alpha_o$ (e.g., 0.1°) need be present in order to create the desired tacking down of the tape to the tape bearing surface of the outrigger. Wraps below 0.1 degrees have a higher risk of the tape popping off the outrigger 402, and wraps above 1.1 degrees may produce an undesirable stress level in the tape.

Figure 5:
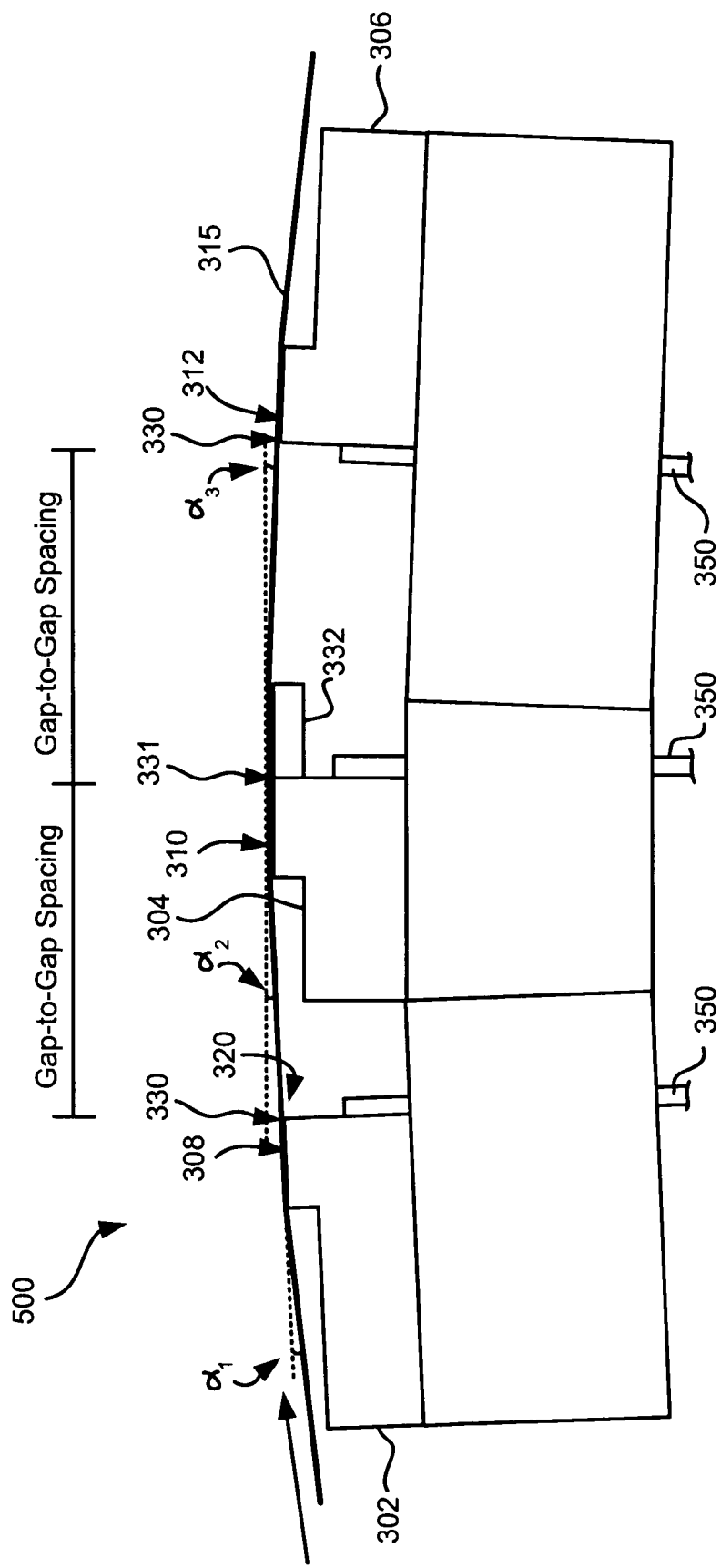
FIG. 5 is a side view of a magnetic tape head with three modules in a tangent (angled) configuration.

Depending on tape tension and stiffness, it may be desirable to angle the tape bearing surfaces of the outer modules relative to the tape bearing surface of the second module. FIG. 5 illustrates an embodiment 500 where the modules 302, 304, 306 are in a tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The inventor has found that the tape will also pop off of the trailing module 306 in this embodiment, thereby reducing wear on the elements in the trailing module 306. These embodiments are particularly adapted for write-read-write applications. Additional aspects of these embodiments are similar to those given above.

Figure 6:
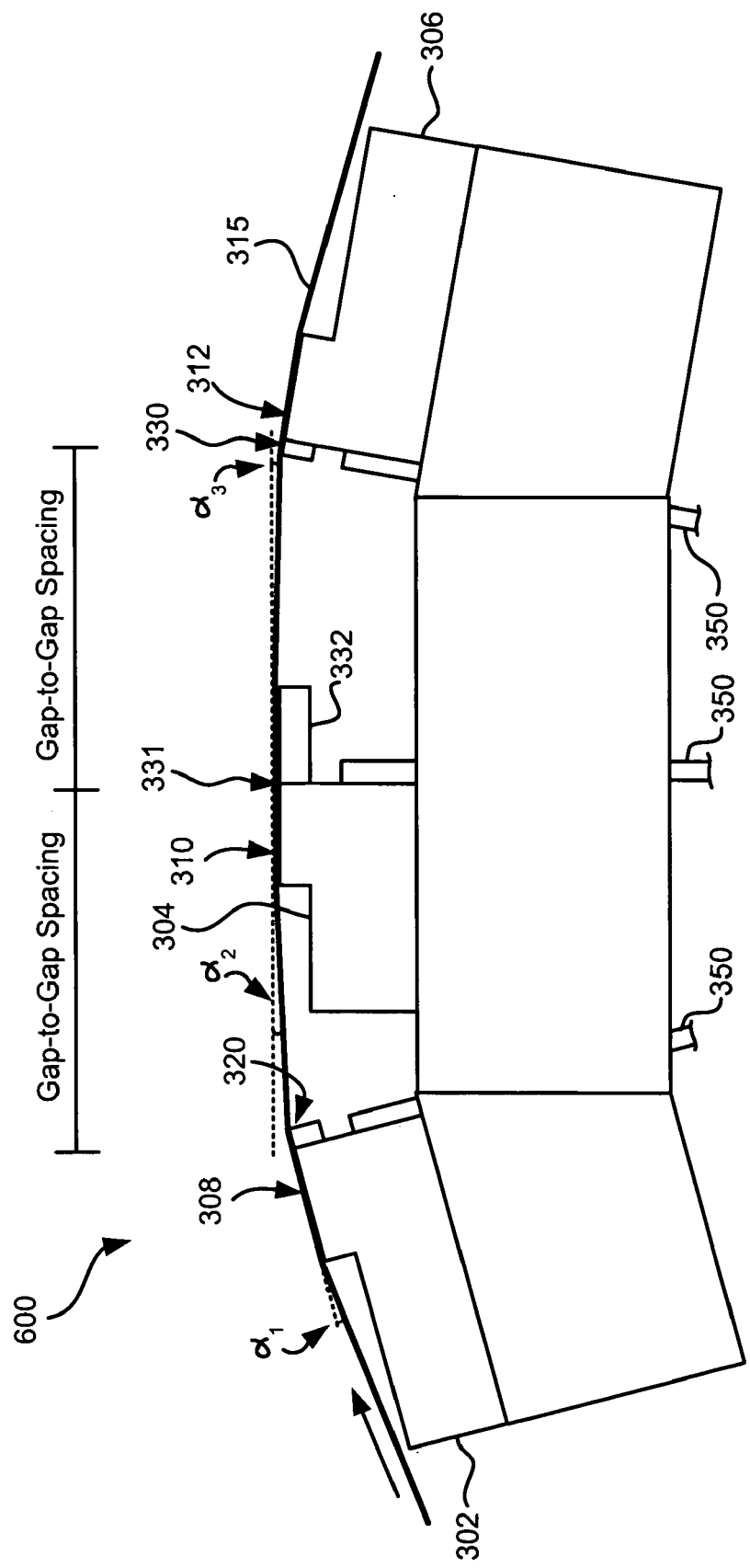
FIG. 6 is a side view of a magnetic tape head with three modules in an overwrap configuration.

FIG. 6 illustrates an embodiment 600 where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore the preferred embodiment has a write-read-write configuration, which may use shortened closures that thus allow closer gap-to-gap separation.

Additional aspects of the embodiments shown in FIGS. 5 and 6 are similar to those given above.

Any of the above embodiments or combinations of portions thereof can also be applied to any type of magnetic heads and magnetic recording systems, both known and yet to be invented. For example, the teachings herein are easily adaptable to interleaved heads, which typically include opposing modules each having an array of alternating readers and writers configured to provide read-while-write capability.

Another embodiment allows reading and/or writing to magnetic media such as magnetic tape in multiple formats. For example, the head can write and/or read data in both legacy and advanced formats, and in doing so enables full backward compatibility with legacy media types. This is an important criterion for customers wishing to move to a new, higher capacity format, yet having data stored on media in an older format. This is accomplished by equipping the head with two arrays of elements (readers and/or writers), each array being associated with a different format. The first and second arrays of elements are proximate to each other in a direction transverse to a direction of travel of a magnetic medium over the head, and so may be formed simultaneously during thin film buildup. Depending on the format, which is generally communicated to the drive by a cartridge memory chip, the proper array is selected (by software, system, user input, etc.) and aligned with a given data band in a conventional way, e.g., by servoing. In one example, once the system determines which format to use, the particular array associated with that format is energized and then used to read/write data on the tape.

Figure 7:
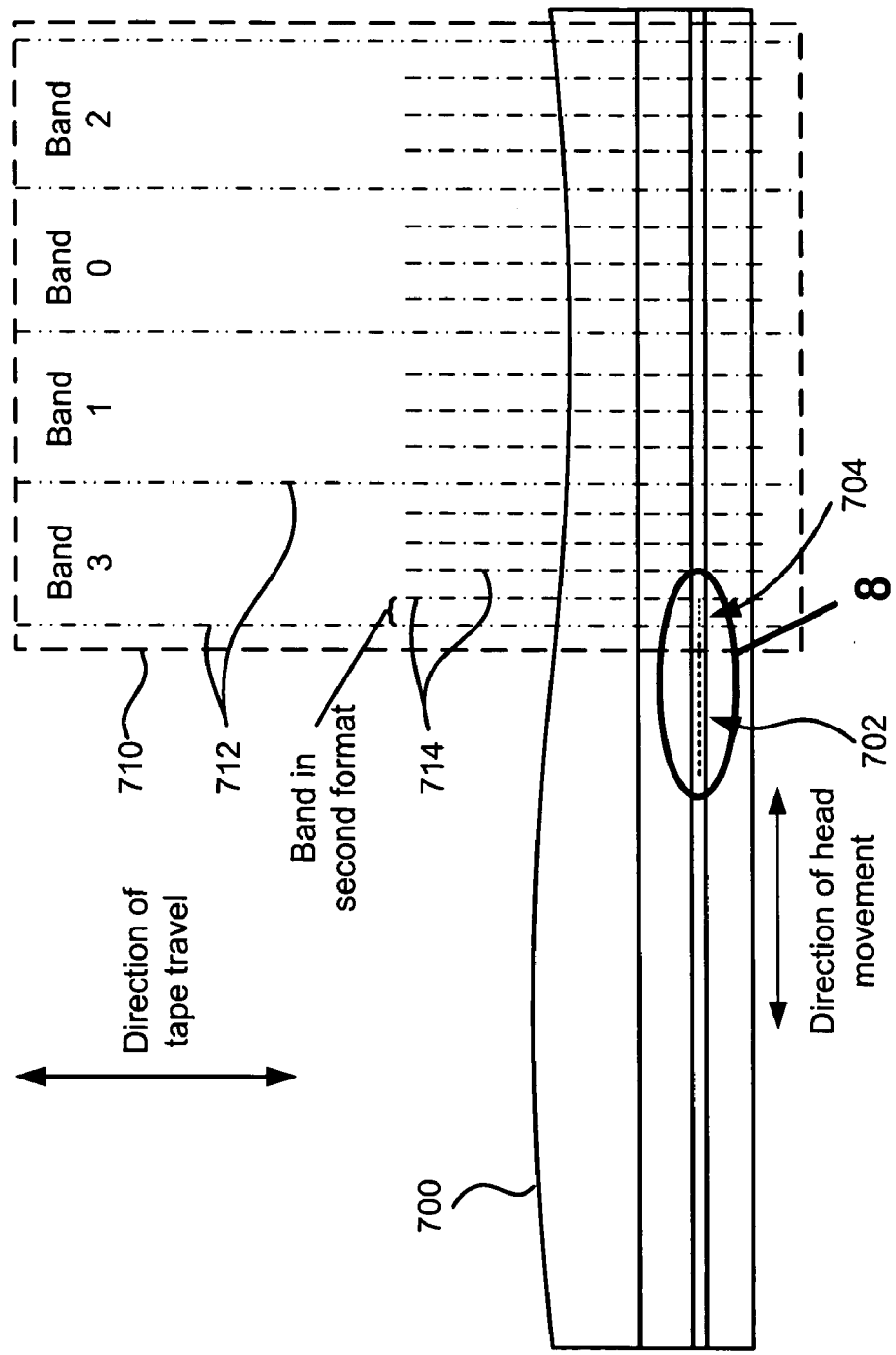
FIG. 7 is a tape bearing surface view of a tape head including two arrays of elements on the same module, each array being adapted for a different format.

FIGS. 7-10 illustrate various potential configurations of a multi-format element array. FIG. 7 illustrates a tape bearing surface view of a module 700 having a first array 702 of elements associated with a first data format, and a second array 704 of elements associated with a second data format, where the first and second data formats are different. Again, the elements can include readers, writers, or both. The tape 710 is shown in dashed lines. While it is not typical to write data in two different formats on the same tape, the present embodiment would enable this feature, as described below. To illustrate different formats, FIG. 7 shows data in the first and second formats overlapping. This is for illustration purposes, and one skilled in the art will appreciate that the data bands in the two formats would not typically be concurrently present on the same area of the tape. Data in the first format is associated with servo tracks 712 and data bands (Band 0-3). Data in the second format is associated with servo tracks 712 and 714, which would be in the same (second) format. The data bands in the second format are significantly smaller and so are not individually identified alphanumerically.

The second data format may be a new generation of a type of format, e.g., first and second generations of the LTO format. The first and second data format may also be a format used by competing vendors, used in different standards, etc. Typically, the differences between formats will include one or more of: differing servo band locations, differing element centerline-to-centerline spacing, differing track density per data band or tape width, differing track centerline-to-centerline spacing, etc. Accordingly, the arrays will have element spacing, element width, servo reader position, etc. that are designed to function in the format with which associated.

Figure 8:
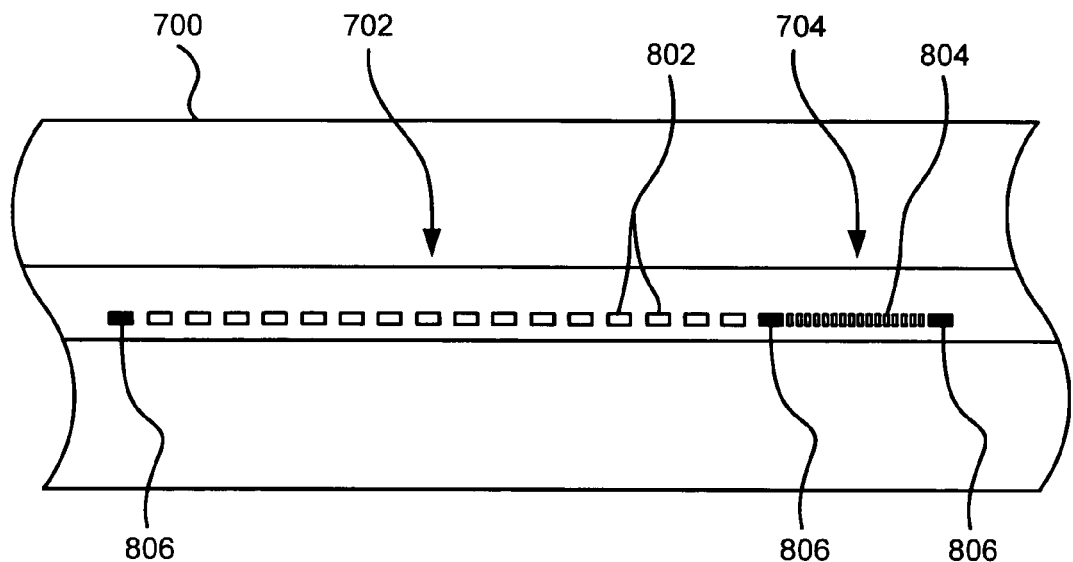
FIG. 8 is a detailed view taken from Circle 8 of FIG. 7 showing two arrays of elements according to one embodiment.
Figure 9:
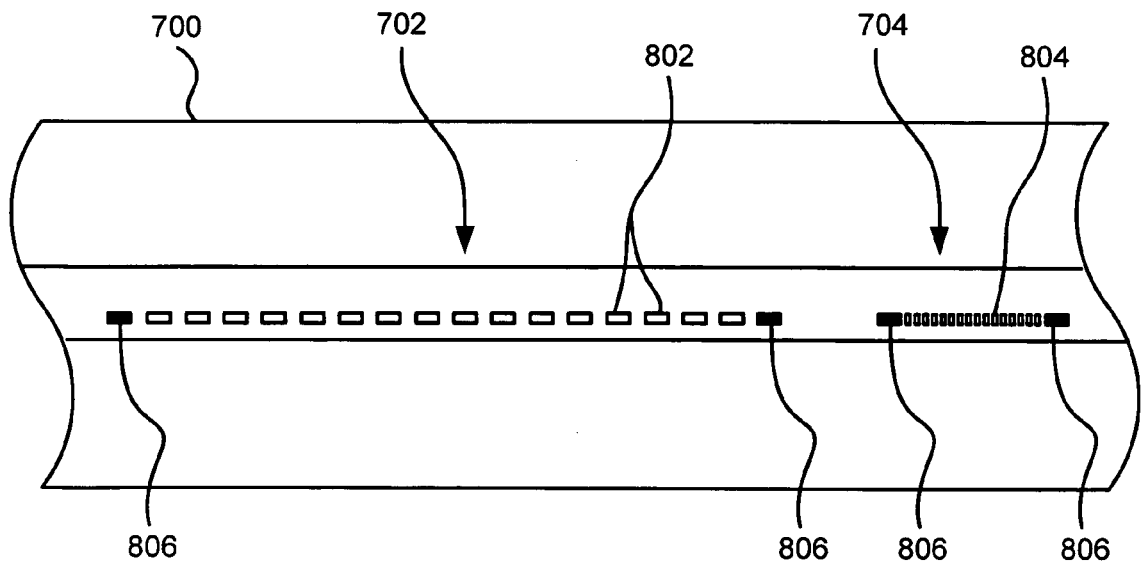
FIG. 9 is a detailed view of a tape bearing surface of a tape head showing two arrays of elements spaced apart laterally.

FIG. 8 illustrates how two arrays 702, 704 might look on a module 700. As shown, the elements 802 of the first array 702 and the elements 804 of the second array 704 are adjacent each other. In some embodiments, including this one, the first and second arrays 702, 704 can share one of the servo readers 806. However, it may be advantageous to space the second array 704 laterally from the first array 702, as shown in FIG. 9. One advantage of spacing the arrays 702, 704 apart is that portions of the tape near or at the edges of the tape tend to induce more wear on the head than other parts of the tape. This is particularly so with older tapes that may be rougher and produce more wear than newer tapes. Newer tapes are designed to reduce wear. The consequence of the uneven wear pattern is that when reading and writing the outer band of a tape in the first format with the first array 702, the edge of the tape might cause wear adjacent to the first array 702, and thus on the second array 704. If, as shown, the second array 704 is more compact than the first array 702, wear may be a concern. By spacing the arrays apart, the wear may be induced between the arrays.

Figure 10:
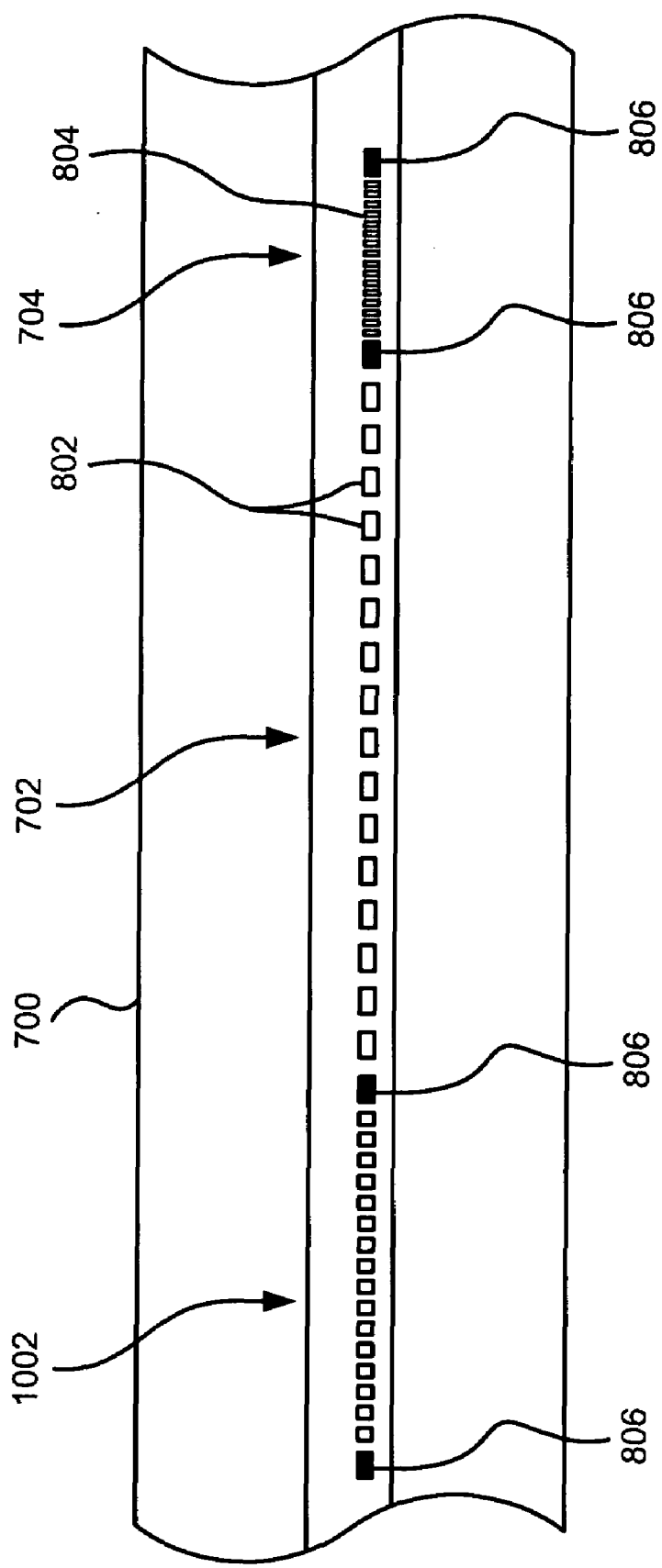
FIG. 10 is a detailed view of a tape bearing surface of a tape head showing three arrays of elements, each for a different format.

Additional embodiments have more than two arrays of elements aligned on a single module, each array associated with a different format. FIG. 10 illustrates an embodiment where three arrays 702, 704, 1002 of elements are present. Again, the arrays may share servo elements or not.

In a write-read-write (W-R-W) head, outer writing modules flank a single reading module. As the names imply, the outer modules include two or more arrays of writers in a configuration, for example, as shown in FIGS. 7-10. The reading module includes two or more arrays of readers in a similar configuration. Variations on the multi-format head include a R-W-R head, a R-R-W head, a W-W-R head, etc.

In a two format embodiment, the second format may be a scaled-down version of the first format. Accordingly, the second array 704 would then also be a scaled-down version of the first array 702, possibly in element-to-element spacing, in element size, in servo-to-servo spacing, etc.

For example, the second array 704 may have the same number of data tracks, but widths are scaled down from the first array 702 by a factor of 5. In other words, the second array 704 is about 20% the width of the first array 702. Thus, the format characteristics are also scaled down. For example, the track density on the tape should increase by at least 2×, more preferably approximately 5×, in the second format as compared to the first format. If the linear data density also doubles, the tape capacity in the second format will be 10× the first format.

Furthermore, with the same gap multiformat concept, the advanced format data organization, e.g. track layout, is not necessarily coupled in any way to the legacy format. Coupling may not be desirable as it may force compromised future areal density or degraded head performance.

Figure 11:
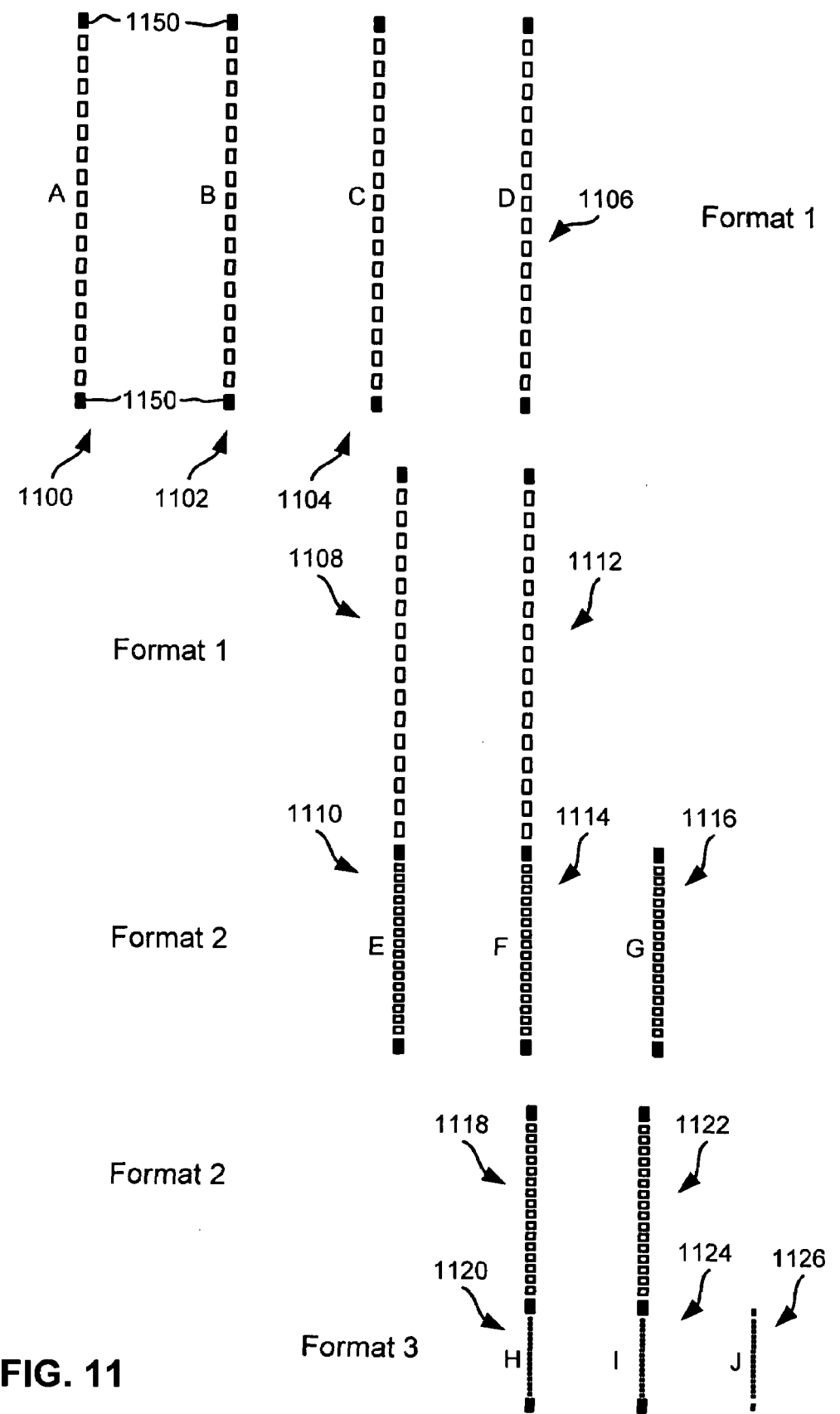
FIG. 11 is a representative diagram illustrating several arrays of elements for several subformats.

FIG. 11 visually illustrates the concept of scaling according to one embodiment. Assume in this embodiment that it is desirable to be able to read in two prior subformats, and write in one prior subformat. Element arrays 1100-1126 in three format families are shown. Each format family has several sub-formats, where each subformat may include a greater data storage capacity than the previous subformat. What defines the format family is the width between the servo readers 1150 of each array, which correspond to a data band width of the medium. The arrays 1100, 1102 in subformats A and B of Format 1 each may have 8 active channels at a given time. The arrays 1104, 1106 in subformats C and D each may have 16 active channels at a given time, yet have the same servo reader spacing as arrays 1100, 1002.

Arrays 1110, 1114, 1116 in the second format may have a smaller servo reader spacing than the arrays in the first format. Arrays 1108, 1112 may have the same number of channels as arrays 1104, 1106. Arrays 1108, 1110 together form a multi-format head that can read prior subformats C, D, and current subformat E and write in prior subformat D and current subformat E. Arrays 1112, 1114 together form a multi-format head that can read subformats D, E, and F and write subformats E and F of Format 2. Array 1116, which in this embodiment need only read back two subformats and write one prior subformat, is able to read subformats E, F, G and write subformats F, G.

Similarly, arrays 1120, 1124, 1126 in the third format have a smaller servo reader spacing than the arrays in the second format. Arrays 1118, 1122 have the same number of channels as arrays 1114, 1116. Arrays 1118, 1120 together form a multi-format head that can read subformats F, G, and H and write in subformats G and H. Arrays 1122, 1124 together form a multi-format head that can read subformats G, H, and I and write subformats H and I. Array 1126, which in this embodiment need only read back two subformats and write one prior subformat, is able to read subformats H, I, J and write subformats I, J.

This type of formatting from generation to generation allows for more frequent scaling of the data band width, as the second array provides backwards compatibility.

A further advantage is that, because the elements occupy a smaller total span, the readback is less susceptible to tape misregistration caused by tape lateral expansion and contraction.

Note that this example was limited to reading back two prior subformats and writing back one prior subformat. However, one skilled in the art will understand that the multi-format heads can read and write back to more or less subformats. For instance, array 1108 may read and write to subformats A-D.

Note also that array 1108 must contain both readers and writers, while array 1112 need contain only writers, that is, the array 1112 does not require readers. Note also, for example, that Format 3 can be introduced starting with subformat G rather than H (as shown) and still adhere to the illustrative compatibility rules.

To assemble any of the embodiments described above, conventional u-beam assembly can be used. Accordingly, the mass of the resultant head can be maintained or even reduced relative to the head of the previous generation. As indicated, the tape bearing surface planes may be parallel. Since the tape pops off of the downstream writer, this has the advantage of eliminating tape reprofiling the trailing writer module critical gap. This is possible because only the upstream writer need be used in either direction of tape motion.

A 32 channel version of this head can use cables 350 (referring back to FIG. 3) having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

For drive integration a two position skew plate is suggested to accommodate for small differences in writer-to-reader module alignment for left and right hand writers.

Benefits of the head configurations described herein include less debris accumulation. Also, the modules may be easier to manufacture as each module may require only readers or writers, and are therefore less susceptible to processing errors. Further, the heads may be simpler to design and assemble, especially where the tape bearing surfaces are on parallel planes, as the modules may not need to be angled relative to each other. In addition, the recording gap widths may be reduced.

Figure 12:
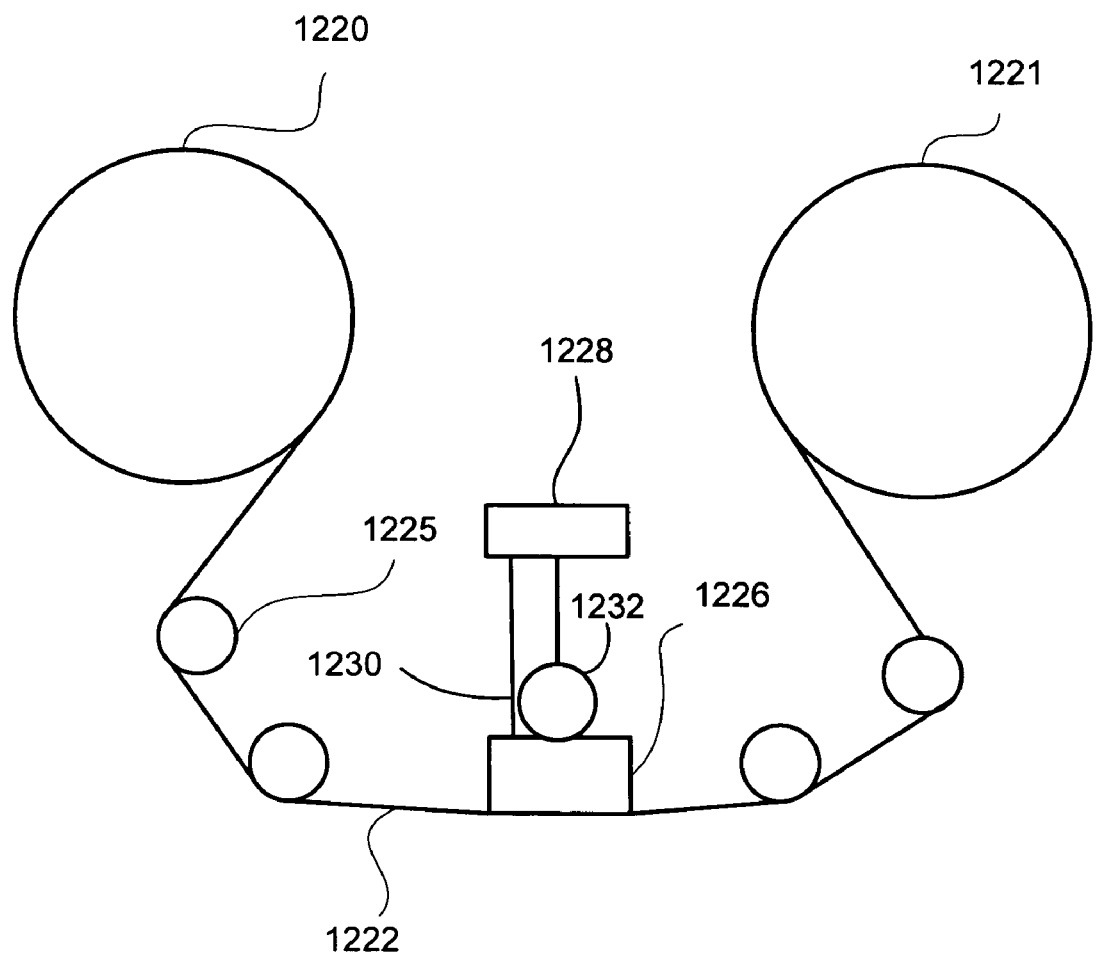
FIG. 12 is a schematic diagram of the tape drive system.

FIG. 12 illustrates a simplified tape drive which may be employed in the context of the present invention. While one specific implementation of a tape drive is shown in FIG. 12, it should be noted that the embodiments of the previous figures may be implemented in the context of any type of tape drive system.

As shown, a tape supply cartridge 1220 and a take-up reel 1221 are provided to support a tape 1222. These may form part of a removable cassette and are not necessarily part of the system. Guides 1225 guide the tape 1222 across a preferably bidirectional tape head 1226, of the type disclosed herein. Such tape head 1226 is in turn coupled to a controller assembly 1228 via a write-read cable 1230. The controller 1228, in turn, controls head functions such as servo following, writing, reading, etc. An actuator 1232 controls position of the head 1226 relative to the tape 1222.

A tape drive, such as that illustrated in FIG. 12, includes drive motor(s) to drive the tape supply cartridge 1220 and the take-up reel 1221 to move the tape 1222 linearly over the head 1226. The tape drive also includes a read/write channel to transmit data to the head 1226 to be recorded on the tape 1222 and to receive data read by the head 1226 from the tape 1222. An interface is also provided for communication between the tape drive and a host (integral or external) to send and receive the data and for controlling the operation of the tape drive and communicating the status of the tape drive to the host, all as will be understood by those of skill in the art.

According to one embodiment of the present invention, a method for writing data to a magnetic tape using a head as describe above includes sending signals to writers on a first module having a flat profile tape bearing surface when the first module is a leading module with respect to a direction of tape travel. Signals from readers are received on a second module having a flat profile tape bearing surface. Signals are sent to writers on a third module having a flat profile tape bearing surface when the third module is a leading module with respect to a direction of tape travel.

Some embodiments of the present invention can take the form of an entirely hardware embodiment, other embodiments of the invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
   a first module having a flat profile tape bearing surface;
   a second module having a substrate, a closure, and elements positioned in a gap between the substrate and closure, the substrate, gap and closure defining at least a portion of a flat profile tape bearing surface; and
   a third module having a flat profile tape bearing surface, the third module being positioned on an opposite side of the second module than the first module,
   wherein the tape bearing surfaces of the first, second and third modules lie along substantially parallel planes, the planes of the first and third modules being offset from the plane of the second module,
   wherein writing and reading functions are performed by different modules at a given time,
   wherein the second module has a closure, wherein the first and third modules do not have a closure, wherein the substrate, the closure, and any gap therebetween define at least a portion of the flat profile tape bearing surface of the second module, the portion of the tape bearing surface of the second module defined by the substrate, the closure, and any gap therebetween being contiguous and planar.

2. The head as recited in claim 1, wherein the second module includes a plurality of readers and no writers, wherein the first and third modules include a plurality of writers and no readers except optional servo readers.

3. The head as recited in claim 2, wherein the readers of the second module are positioned in a gap, wherein the gap is less than about 12 microns thick as measured parallel to a direction of tape travel thereover, wherein the writers of the first and third modules are positioned in a gap on the associated module, wherein each gap is less than about 15 microns thick as measured parallel to a direction of tape travel thereover.

4. The head as recited in claim 1, wherein positions of the modules are fixed relative to each other.

5. The head as recited in claim 1, wherein each module includes elements positioned in a gap thereof, wherein a gap to gap spacing between the gaps of the first and second modules is less than about 1 mm.

6. The head as recited in claim 5, wherein a gap to gap spacing between the gaps of the second and third modules is about the same as the gap to gap spacing between the gaps of the first and second modules.

7. The head as recited in claim 1, wherein each module includes elements positioned in a gap thereof, wherein a gap to gap spacing between the gaps of the first and second modules is less than about 0.75 mm.

8. The head as recited in claim 1, wherein the plane of the tape bearing surface of the first module is positioned below the plane of the tape bearing surface of the second module.

9. The head as recited in claim 1, wherein the plane of the tape bearing surface of the third module is positioned below the plane of the tape bearing surface of the second module.

10. The head as recited in claim 1, wherein the plane of the tape bearing surface of the first module lies along substantially the same plane as the tape bearing surface of the third module.

11. The head as recited in claim 1, wherein the first, second, and third modules each have a closure, wherein the closure of the first and third modules are shorter than the closure of the second module as measured parallel to a direction of tape travel over the respective module, wherein the tape bearing surface of each of the modules is planar along all points thereof.

12. The head as recited in claim 1, further comprising an outrigger for setting an outer wrap angle of the first module.

13. The head as recited in claim 1, wherein at least one of the modules includes a first array of elements and a second array of elements, the first array of elements being associated with a first data format and the second array of elements being associated with a second data format, the elements of the first and second arrays being selected from a group consisting of readers, writers, and combinations thereof.

14. The head as recited in claim 13, wherein the first and second arrays of elements of the at least one of the modules are adjacent each other in a direction transverse to a direction of travel of a magnetic medium over the head.

15. The head as recited in claim 13, wherein the second array of the at least one of the modules is a scaled version of the first array of the at least one of the modules.

16. The head as recited in claim 1, wherein a tape passing across the first module prior to passing across the third module does not become parallel to the tape bearing surface of the third module when passing across the third module.

17. The head as recited in claim 1, wherein a first wrap angle is defined between the tape bearing surfaces of the first and second modules, the first wrap angle being in a range of about 0.7° to about 1.1°, wherein a second wrap angle is defined between the tape bearing surfaces of the second and third modules, the second wrap angle being in a range of about 0.7° to about 1.1°.

18. A tape drive system, comprising:
a magnetic head as recited in claim 1;
a drive mechanism for passing a magnetic recording tape over the head; and
a controller in communication with the head.

* * * * *